(12) United States Patent
Wolfond et al.

(10) Patent No.: US 11,301,943 B2
(45) Date of Patent: Apr. 12, 2022

(54) SYSTEMS AND METHODS FOR AUTHENTICATION OF DATABASE TRANSACTIONS WITH AN AUTHENTICATION SERVER

(71) Applicant: Authenticor Identity Protection Services Inc., Toronto (CA)

(72) Inventors: Gregory Howard Wolfond, Toronto (CA); Jaime Shapiro, Toronto (CA); Patrick Hans Engel, Richmond Hill (CA); Pierre Antoine Roberge, Toronto (CA)

(73) Assignee: Authenticor Identity Protection Services Inc., Toronto (CA)

( * ) Notice: Subject to any disclaimer, the term of this patent is extended or adjusted under 35 U.S.C. 154(b) by 1616 days.

(21) Appl. No.: 15/060,643

(22) Filed: Mar. 4, 2016

(65) Prior Publication Data

US 2016/0225110 A1   Aug. 4, 2016

Related U.S. Application Data

(63) Continuation of application No. 12/522,515, filed as application No. PCT/CA2008/000017 on Jan. 8, 2008, now abandoned.

(30) Foreign Application Priority Data

Jan. 8, 2007 (CA) .................................. CA 2573053

(51) Int. Cl.
*G06Q 50/16* (2012.01)
*G06Q 10/10* (2012.01)
(Continued)

(52) U.S. Cl.
CPC ......... *G06Q 50/16* (2013.01); *G06F 21/6209* (2013.01); *G06Q 10/10* (2013.01);
(Continued)

(58) Field of Classification Search
None
See application file for complete search history.

(56) References Cited

U.S. PATENT DOCUMENTS 6,898,577 B1   5/2005   Johnson et al.
6,931,546 B1   8/2005   Kouznetsov et al.
(Continued)

FOREIGN PATENT DOCUMENTS

| AU | 2008204670 A1 | 7/2008 |
| CA | 2674869 A1 | 7/2008 |
| WO | 2008083467 A1 | 7/2008 |

OTHER PUBLICATIONS

Office Action for CA Application No. 2674896 dated Sep. 9, 2014.
(Continued)

*Primary Examiner* — Andrew B Whitaker
(74) *Attorney, Agent, or Firm* — Bereskin & Parr LLP/S.E.N.C.R.L., s.r.l.

(57) ABSTRACT

Systems and methods for enhancing the security of an electronic database system. The system has a registry server hosting a registry database accessible by a registry user, and an authorization server hosting an authorization database. In operation, the registry server queries the authorization server to determine whether a particular record is locked. When a record is locked, an authorization service key is requested from the registry server and verified by the authorization server.

18 Claims, 8 Drawing Sheets

(51) Int. Cl.
*G06Q 99/00* (2006.01)
*G06F 21/62* (2013.01)
*H04L 29/06* (2006.01)

(52) U.S. Cl.
CPC ........... *G06Q 50/167* (2013.01); *G06Q 99/00* (2013.01); *H04L 63/083* (2013.01); *H04L 63/102* (2013.01)

(56) References Cited

U.S. PATENT DOCUMENTS

| | | | | |
|---|---|---|---|---|
| 7,720,688 | B1* | 5/2010 | Baron | G06Q 10/10 705/313 |
| 2001/0029482 | A1* | 10/2001 | Tealdi | G06Q 40/00 705/38 |
| 2001/0047282 | A1* | 11/2001 | Raveis, Jr. | G06Q 10/1095 705/7.19 |
| 2003/0036922 | A1* | 2/2003 | Fries | G06Q 40/00 705/316 |
| 2003/0074568 | A1 | 4/2003 | Kinsella et al. | |
| 2003/0182151 | A1* | 9/2003 | Taslitz | G06Q 20/382 705/64 |
| 2005/0177389 | A1* | 8/2005 | Rakowicz | G06Q 10/10 705/75 |
| 2005/0187863 | A1 | 8/2005 | Whinery et al. | |
| 2005/0209873 | A1* | 9/2005 | Anastasi | G06Q 10/10 705/1.1 |
| 2005/0210068 | A1* | 9/2005 | Szymanski | G06Q 10/08 |
| 2006/0026136 | A1* | 2/2006 | Drucker | G06Q 50/16 |
| 2006/0064375 | A1* | 3/2006 | Campagna | G06Q 10/10 705/39 |
| 2006/0116952 | A1* | 6/2006 | Orfano | G06Q 40/02 705/38 |
| 2006/0184452 | A1* | 8/2006 | Barnes | H04L 9/3247 705/50 |
| 2007/0219819 | A1* | 9/2007 | Campbell | G06Q 40/02 705/35 |
| 2008/0167883 | A1* | 7/2008 | Thavildar Khazaneh | G06Q 99/00 705/1.1 |
| 2010/0125527 | A1 | 5/2010 | Wolfond et al. | |
| 2010/0318801 | A1* | 12/2010 | Roberge | H04L 9/3247 713/172 |

OTHER PUBLICATIONS

Prosecution History for AU Application No. 2008204670 dated Aug. 29, 2011.
International Preliminary Report on Patentability for PCT/CA2008/000017 dated May 25, 2009.
International Search Report for PCT/CA2008/000017 dated May 20, 2008.
Written Opinion for PCT/CA2008/000017 dated May 20, 2008.
Amendment for corresponding application EP08706188.3 dated Jul. 11, 2011.
European Search Report for EP08706188.3 dated Dec. 22, 2010.
Office Action for EP08706188.3 dated Nov. 18, 2011.
Response to Office Action for EP08706188.3 dated May 25, 2012.
Prosecution History for U.S. Appl. No. 12/522,515.

* cited by examiner

SYSTEMS AND METHODS FOR AUTHENTICATION OF DATABASE TRANSACTIONS WITH AN AUTHENTICATION SERVER

CROSS-REFERENCE TO RELATED APPLICATIONS

This application is a continuation of U.S. patent application Ser. No. 12/522,515, filed 29 Dec. 2009, which is the National Stage of International Application No. PCT/CA2008/000017, filed 8 Jan. 2008, which claims the benefit of priority from Canadian Patent Application No. 2,573,053, filed 8 Jan. 2007. The entire contents of each of U.S. patent application Ser. No. 12/522,515, International Application No. PCT/CA2008/000017 and Canadian Patent Application No. 2,573,053 are incorporated herein by reference.

FIELD OF THE INVENTION

The invention described herein relates to systems and methods for enhancing data security in electronic database systems and, in particular, to systems and methods for authentication of database transactions using an authentication server.

BACKGROUND OF THE INVENTION

Fraud in real estate transactions has become a serious problem. If a criminal is able to obtain personal information relating to a property owner, the criminal can assume the identity of the property owner to unsuspecting buyers, and sell the property without the prior knowledge of the property owner. Alternately, the criminal can obtain a mortgage on the property from a new mortgage holder, and disappear with the money, again without the prior knowledge of the property owner.

Whinery (U.S. Patent Application Publication No. 2005/0187863) describes a method for protecting a true owner's equity in real estate from fraudulent transactions. A lien holder records a lien against title on real estate, specifying that the lien holder must be contacted and a payoff statement obtained from the lien holder prior to closing any subsequent transaction involving the real estate. Personal evidence of the true owner's identity is also compiled and documented. Before providing the payoff statement, the lien holder uses the owner's personal evidence to verify that the individual attempting to carry out the subsequent transaction is the true owner of the real estate.

Taslitz (U.S. Patent Application Publication No. 2003/182151) teaches a method of using a biometric credential as a legal seal for the purpose of authenticating a real estate deed. The biometric credential is stored in a central repository for subsequent verification of the identity of the presenter of the deed. The deed is impressed with a serial number or other unique indicia. When the deed, or a copy thereof, is presented to a financial institution, the serial number on the deed is scanned, and transmitted to a remote computer. At the same time, a biometric sample is taken of the individual presenting the deed. The remote computer verifies the identity of the individual presenting the deed only if the scanned biometric matches the biometric associated with the scanned serial number.

Johnson (U.S. Pat. No. 6,898,577) describes a method of using biometrics to authorize the release of escrow funds in the context of a real estate transaction.

Kinsella (U.S. Patent Application Publication No. 2003/0074568) describes a method of performing secure transactions, such as a real estate transaction, using an electronic passkey that stores a biometric credential of its owner. The passkey authorizes the transaction if a biometric sample read by the passkey matches the biometric credential stored in the passkey.

SUMMARY OF THE INVENTION

According to the invention described herein, a change in title to real estate proceeds only if the true owner of the real estate provides authorization to a trusted authority to effect the change to the title.

According to a first aspect of the invention, there is provided a method for authorizing a change in title to real estate, that involves the following steps:
a) verifying the identity of a party requesting a change in title to a specific item of real estate as the true owner of the specific item of real estate; and
b) providing a title change authorization in accordance with an outcome of the verification, the title change authorization authorizing a specific individual to effect the change in title to the specific item of real estate.

According to the first aspect of the invention, there is also provided an authorization server for authorizing a change in title to real estate. The authorization server is in communication with a title lock database having a plurality of title lock records. Each title lock record is associated with a specific item of real estate, and includes an indication of an authorization by an owner of the specific item real estate for a change in title to the specific item of real estate. The authorization server includes:
owner identity verification means for verifying the identity of a party requesting a change in title to a specific item of real estate as the true owner of the specific item of real estate; and
title change authorization means coupled to the owner identity verification means and the title lock database, the title change authorization means being configured to update the title lock record associated with the specific item of real estate with a title change authorization authorizing a specific individual to effect the change in title to the specific item of real estate.

According to a second aspect of the invention, there is provided a method for effecting a change in title to real estate, that involves the following steps:
verifying the identity of an individual as a trusted authority authorized to modify title to real estate; and
in accordance with an outcome of the verification, authorizing the individual to effect a change in title to a specific item of real estate in accordance with a prior authorization by an owner of the specific item of real estate for the change in title to the specific item of real estate.

According to the second aspect of the invention, there is also provided a title change server for effecting a change in title to real estate. The title change server is in communication with a title lock database having a plurality of title lock records. Each title lock record is associated with a specific item of real estate, and includes an authorization by an owner of the specific item real estate for a change in title to the specific item of real estate. The title change server includes:
authority identity verification means for verifying the identity of an individual as a trusted authority authorized to modify title to real estate; and title change means coupled to the authority identity verification means and the title lock database, the title change means being configured to authorize the individual to effect a change in title to a specific item of real estate in accordance with the title lock record associated with the specific item of real estate.

According to a third aspect of the invention, there is provided a method for effecting a change in title to real estate, that involves the following steps:
a) receiving a party identity verification verifying the identity of a party requesting a change in title to a specific item of real estate as the true owner of the specific item of real estate;
b) providing a title change authorization in accordance with an outcome of the party identity verification, title change authorization authorizing a specific individual to effect the change in title to the specific item of real estate;
c) receiving an individual identity verification verifying the identity of the specific individual as a trusted authority authorized to modify title to real estate; and
d) in accordance with an outcome of the individual identity verification, authorizing the individual to effect the change in title to the specific item of real estate in accordance with the title change authorization.

According to the third aspect of the invention, there is also provided an authorization system for authorizing a change in title to real estate. The authorization system includes:
a title lock database having a plurality of title lock records, each said title lock record being associated with a specific item of real estate and including an indication of an authorization by an owner of the specific item real estate for a change in title to the specific item of real estate;
title change authorization means coupled to the title lock database, the title change authorization means being configured to update the title lock record associated with the specific item of real estate with a title change authorization authorizing a specific individual to effect the change in title to the specific item of real estate; and
title change means coupled to the title lock database, the title change means being configured to authorize the individual to effect the change in title to the specific item of real estate in accordance with the title lock record associated with the specific item of real estate.

In a preferred implementation, the owner identity verification means verifies the identity of the party requesting a change in title to a specific item of real estate by comparing a biometric credential of the requesting party against a prior saved biometric credential of the true owner of the specific item of real estate. Similarly, the authority identity verification means verifies the identity of the individual authorized to modify title to real estate by comparing a biometric credential of the individual against a prior saved credential of a trusted authority authorized to modify title to real estate.

Preferably, the authorization granted to the trusted authority only authorizes the individual to effect the change in title within a predetermined time period.

BRIEF DESCRIPTION OF THE DRAWINGS

The invention will now be described by way of example only with reference to the accompanying drawings in which.

DETAILED DESCRIPTION OF THE PREFERRED EMBODIMENTS

Title Authorization Network—Overview

Figure 1:
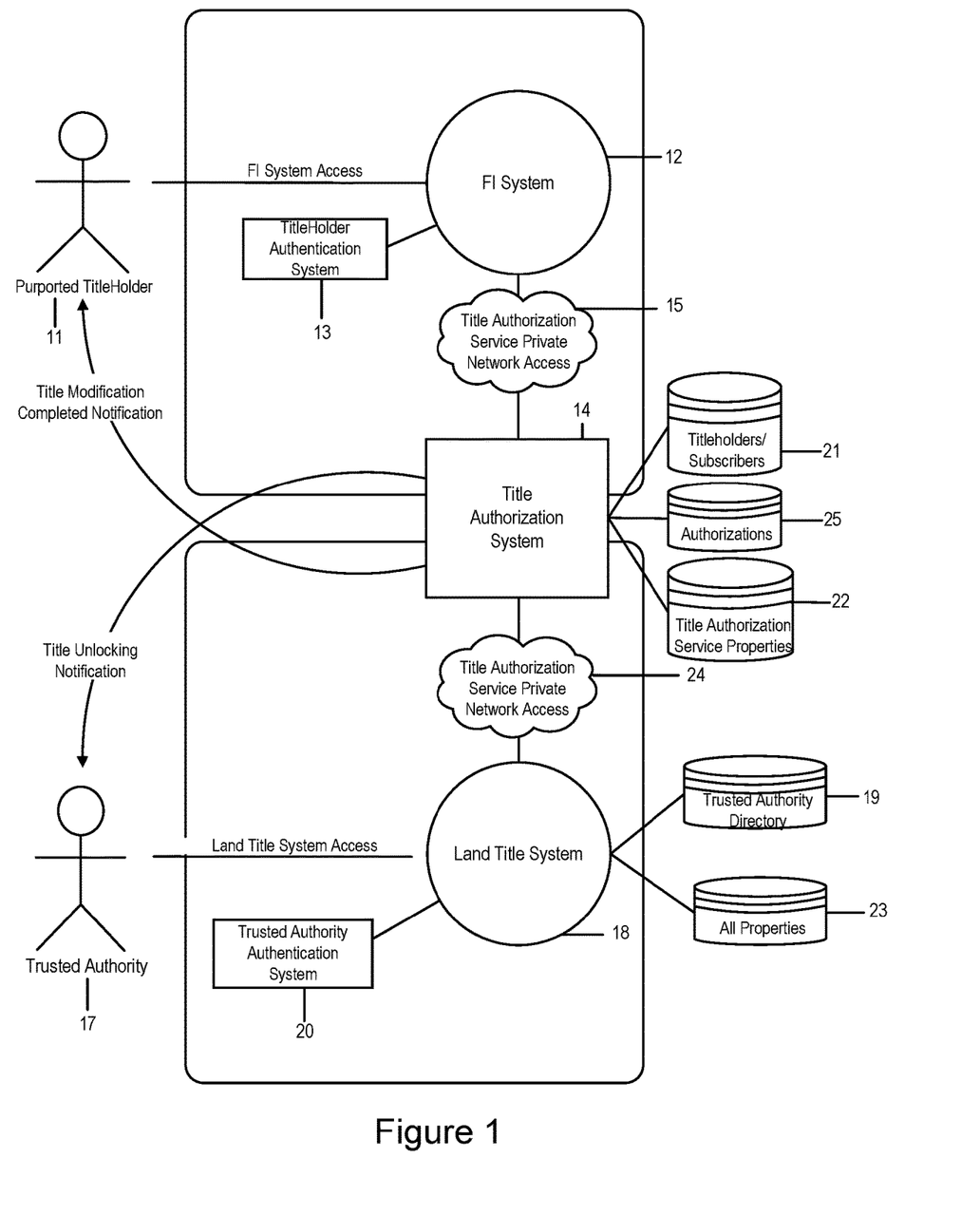
FIG. 1 is a diagram depicting an overview of a method and system for preventing or allowing changes to a title held in a land title system, in accordance with an embodiment of the present invention.

A title authorization network, according to the invention described herein, implements a title authorization service that comprises identity verification and authorization procedures for authorizing changes in title to real estate properties. As shown in FIG. 1, the title authorization network comprises a land title system (LTS) 18, a financial intermediary (FI) 12, and title authorization system 14.

The LTS 18 comprises a computer server and an electronic database 23 that are maintained by or on behalf of a government authority. The LTS database 23 includes records that identify specific real estate properties (e.g. lot, part of a lot) within a land title system, and the persons or entities ("titleholder") who have legal ownership (partial or full) of these properties.

Although the LTS 18 typically maintains a record of instruments that are recorded against title to real estate properties that are registered under a Land Titles System (e.g. a system in which the government authority guarantees title to each property), the LTS 18 may also maintain a record of instruments that are recorded against title to real estate properties that are registered under a Land Registry System (e.g. a system in which purchasers must search historical title documents to verify title).

The LTS server is interfaced with the LTS database 23, and effects changes in title (e.g. transfers, encumbrances) to the real estate properties that are registered in the LTS database 23. The LTS server also serves to make the LTS database records available to "trusted authorities". Trusted authorities are individuals who are authorized to effect changes in title to the real estate properties that are registered with the LTS 18. Typically, trusted authorities are lawyers, or other persons who are legally entitled to effect changes in title to real estate.

The LTS server is also in communication with a trusted authority database 19 that identifies trusted authorities who are authorized to access the LTS 18. Typically the trusted authority database 19 includes records associated with each lawyer that is authorized to practice law in the jurisdiction covered by the title authorization service, and is maintained by the local authority that regulates lawyers in that jurisdiction.

The LTS server includes computer software that implements a front-end user interface that performs verification procedures to verify that each individual who is attempting to effect a change in title to a real estate property is authorized to modify records of the LTS 18 (i.e. the individual is a "trusted authority"). Alternately, these identity verification procedures may be implemented by a separate server, such as the trusted authority authentication system 20.

The FI 12 comprises a computer server and database that is typically implemented at a financial intermediary. Typically, the financial intermediary is a bank, mortgage provider, or insurance company.

The FI server is interfaced with the FI database and includes computer software that implements certain system interfaces (described below) that provide the titleholder with access to the title authorization system 14. Preferably the FI computer software implements a front-end user interface that provides the titleholder with access to the title authorization service via a branch office of the financial intermediary, or by web or telephone channels.

The FI computer software also implements identity verification procedures to verify that each individual who is requesting a change in title to a specific real estate property is a registered user of the title authorization service. Alternately, these identity verification procedures may be implemented by the titleholder authentication system 13.

The title authorization system 14 is in communication with the FI 12 via the private network 15, and is in communication with the LTS 18 via the private network 24. Typically, the networks 15, 24 are implemented using secure communications channels implemented over the public internet, or dedicated connections implemented over a private network.

The title authorization system 14 includes a collection of title authorization system databases and associated computer servers/hardware. As shown, the title authorization system databases include a titleholder/subscriber database 21, a title authorization service properties database 22, and an authorizations database 25.

The titleholder/subscriber database 21 is a collection of identity records that include identity information regarding each titleholder that is registered to use the title authorization network.

The title authorization service properties database 22 is a collection of title records that associates real estate properties, that are registered in the LTS 18, with the corresponding titleholder. For a real estate property to be included in the title authorization service properties database 22, the associated titleholder must be registered to use the title authorization service and have an identity record in the titleholder/subscriber database 21.

Each title record in the title authorization service properties database 22 is associated with a specific real estate property that is registered in the LTS 18, and includes a status field which indicates whether the titleholder of the property has authorized a change in title to the property (i.e. the titleholder has "unlocked" title to the property), or whether the titleholder has not authorized a change in title to the property (i.e. the titleholder has "locked" title to the property). By default, when a title record is created, the status field indicates that title to the associated real estate property is "locked".

The authorization database 25 is a collection of authorization records that include authorization information regarding each "unlocked" real estate property that is registered in the title authorization service. Each authorization record in the authorization database 25 is associated with a specific real estate property that is registered in the LTS 18, and includes a trusted authority field which includes an identifier that uniquely identifies the trusted authority who the titleholder has authorized to effect a change in title to the property. Preferably, each authorization record also includes an expiry date field which indicates the date by which the trusted authority must effect the change in title to the titleholder's property.

The title authorization system 14 also includes computer-software which acts in association with the title authorization system databases to implement the title authorization service. These computer-software implement a title change authorization procedure and a title change procedure. Both the title change authorization procedure and the title change procedure interface with the titleholders database 21, title authorization service properties database 22 and the authorization database 25.

The title change authorization procedure is configured such that if a titleholder issues an authorization authorizing a change in title to the titleholder's property, the title change authorization procedure updates the corresponding title record and creates an authorization record to indicate that a specific trusted authority is authorized to effect the change in title to that property.

Specifically, if the FI 12 receives a request from an individual requesting that a specific trusted authority effect in change in title to a specific real estate property, the FI 12 attempts to verify the identity of the party that requested the change. If the FI 12 confirms the identity of the individual requesting the change in title, the FI 12 attempts to verify that the party requesting the change is the titleholder of the property and is registered in the titleholder/subscriber database 21. If so, the FI 12 issues a title change authorization to the title authorization system 14 indicating that the titleholder of the property has authorized a specific trusted authority to effect a change in title to the property. Optionally, the title change authorization specifies the period of time during which the trusted authority is authorized to effect the change in title to the property.

Upon receipt of the title change authorization, the title change authorization procedure creates an authorization record in the authorization database 25 to indicate that a specific trusted authority is authorized to effect the change in title to that property and updates the status field of the title record that is associated with the real estate property in the title authorization service properties database 22 to indicate that the titleholder of the property has "unlocked" or authorized a change in title to that real estate property. The title authorization record in the authorization database 25 uniquely identifies the trusted authority that is authorized to effect the change in title to the property associated with the change authorization. Further, if specified in the title change authorization, the title change authorization procedure include in the authorization record the expiry date by which the trusted authority must effect the change in title to the titleholder's property.

The title change procedure is configured such that, if a trusted authority requests authorization to modify title to a specific real estate property, the title change procedure authorizes the trusted authority to effect a change in title to the real estate property only in accordance with the prior authorization by the titleholder of the property.

Specifically, if the LTS 18 receives a request from an individual requesting authorization to modify title to a specific real estate property, the LTS 18 first verify if the specific real estate property is enrolled in the title authorization system 14. If it is the case, the LTS 18 attempts to verify the identity of the individual that requested the authorization. If the LTS 18 confirms the identity of the individual that requested the authorization, the LTS 18 issues a change authorization request to the title authorization system 14.

Upon receipt of the change authorization request, the title change procedure reads the status field of the title record that is associated with the real estate property in the title authorization service properties database 22 to determine whether the titleholder has authorized a change in title to that property. If the status field indicates that the titleholder has unlocked title to the property, the title change procedure reads the trusted authority field of the authorization record that is associated with the real estate property in the authorization database 25 for the unique indicator of the trusted authority that is authorized to effect the change in title to the property.

If the unique indicator in the trusted authority field matches the trusted authority identifier that was received from the LTS 18, the title change procedure reads the expiry date field of the authorization record. If the change authorization request was issued prior to the date specified in the expiry date field, the title change procedure issues an authorization to the LTS 18 authorizing the trusted authority to effect a change in title to the specific real estate property. The LTS 18 then effects the change in title to the specific real estate property, as initiated by the trusted authority. The LTS 18 notify the title authorization system 14 when the changes have been completed by the trusted authority.

Title Authorization Network—Detailed Discussion

Figure 2:
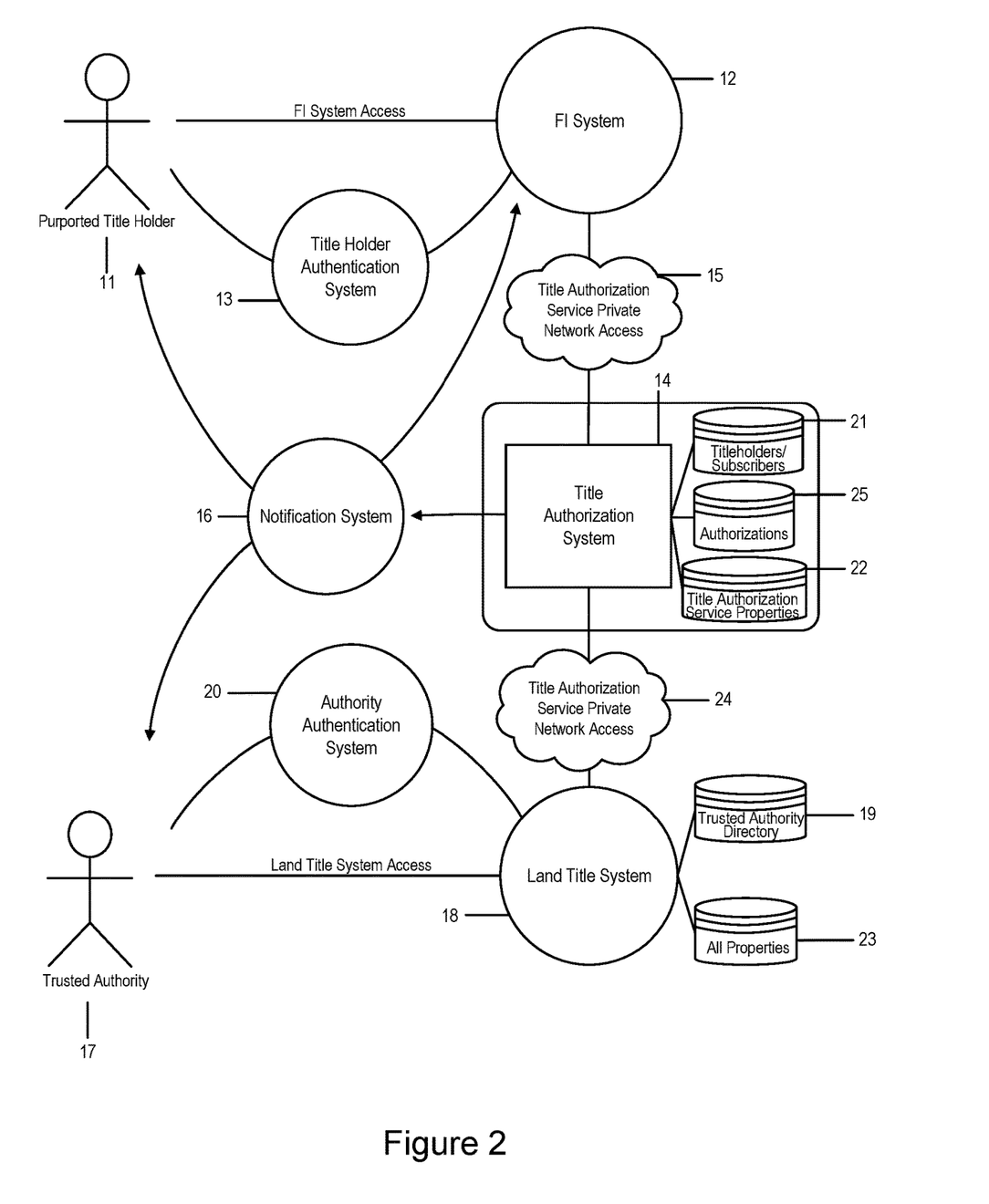
FIG. 2 is depicts the interfaces in a system in an embodiment of the invention, for preventing or allowing changes to a title held in a land title system.

Additional details of the title authorization network are depicted in FIG. 2. The FI 12 includes a front-end user interface for a person attempting to enrol title to a real estate property (a purported titleholder 11) in the title authorization system 14. Preferably, the front-end user interface provides "strong authentication", using at least 2 factor authentication, to verify the identity of the purported titleholder 11. Typically, "strong authentication" requires the purported titleholder 11 to provide a personal authentication factor, such as a biometric (e.g. a fingerprint, a voice print, a face print, an iris scan, a sample of handwriting, a handprint, a capillary map, or DNA), or personal information comprising answers to knowledge-based questions (such as mother's maiden name, father's middle name, name or location of grade school attended, favourite colour, musical instruments played).

The FI 12 can provide titleholder authentication using either personal information or biometric information, or both personal information and biometric information. In addition, a password that is only known to the titleholder can be used in combination with the one or more of the aforementioned authentication factors to provide an additional level of security.

Alternately, titleholder authentication may be performed by an identity authentication system 13 which is coupled to the FI 12. In another variation (not shown), the identity authentication system 13 is coupled to the title authorization system 14. Still alternately, the strong authentication of the purported titleholder 11 may be performed by the title authorization system 14.

The LTS 18 includes a front-end user interface for the trusted authorities 17. Preferably, the front-end user interface provides "strong authentication" of the trusted authority 17 using at least 2 factor authentication to verify the identity of the trusted authority 17. One such authentication factor may comprise biometric information (such as a fingerprint, a voice print, a face print, an iris scan, a sample of handwriting, a handprint, a capillary map, or DNA). Another authentication factor may comprise personal information, which includes answers to knowledge-based questions (such as mother's maiden name, father's middle name, name or location of grade school attended, favourite colour, musical instruments played).

The LTS 18 can provide identity authentication using either personal information or biometric information, or both personal information and biometric information. In addition, a password that is only known to the trusted authority 17 can be used in combination with the one or more of the aforementioned authentication factors to provide an additional level of security.

Alternately, identity authentication may be performed by an identity authentication system 20 which is coupled to the LTS 18. In another variation (not shown), the identity authentication system 20 is coupled to the title authorization system 14. Alternately, the identity authentication of the trusted authority 17 may be performed by the title authorization system 14.

As shown, the title authorization network may include a notification system 16 that is in communication with the title authorization system 14. The notification system 16 is used to issue notifications to a titleholder, a trusted authority 17 or the FI 12. Preferably, the notification system 16 issues a notification to the titleholder when a title modification request has been made, and again when the title modification request has been completed. Typically, the notifications comprise email or text messages that are sent to a specified address.

System Interfaces of Title Authorization System 14

Figure 3:
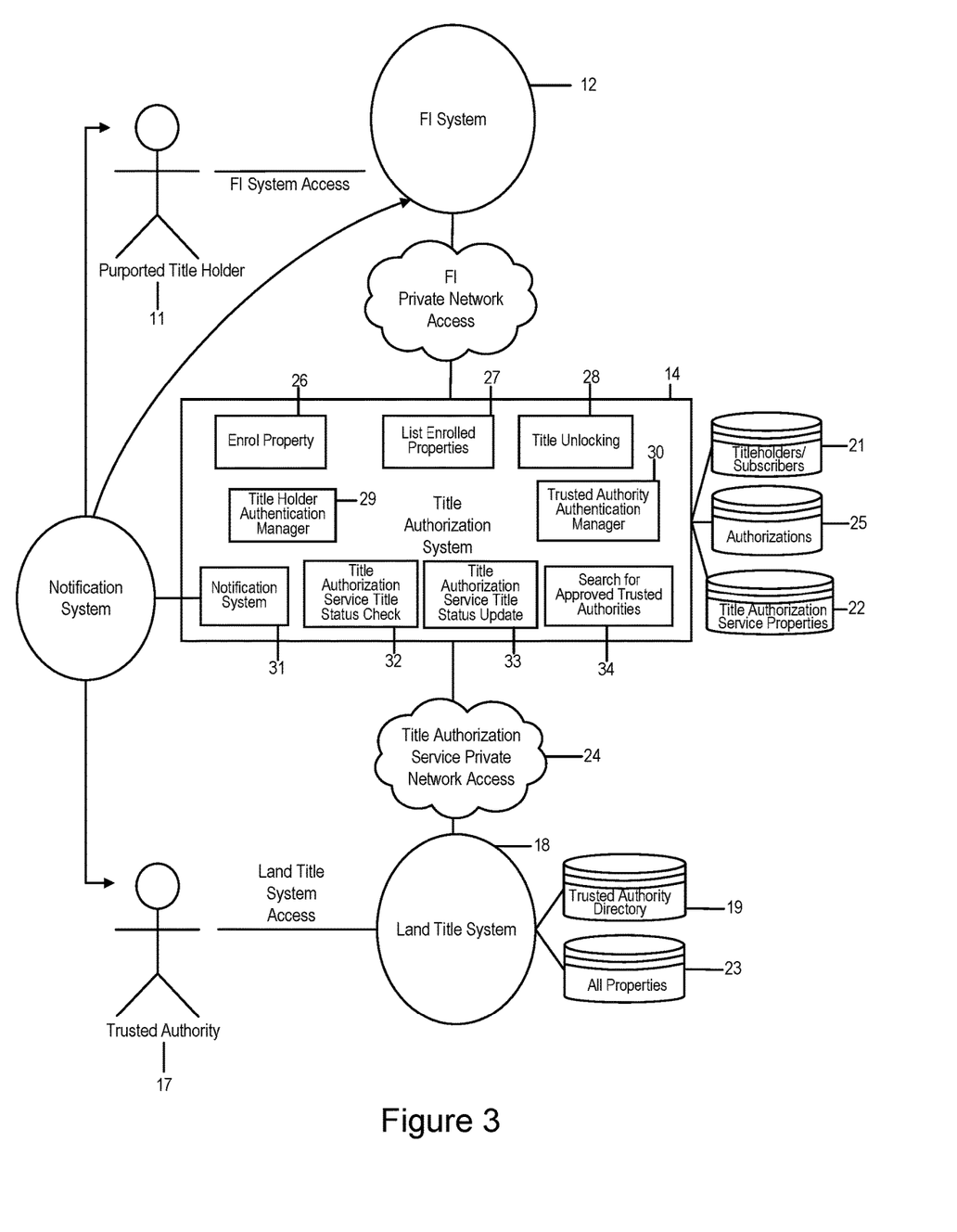
FIG. 3 is a diagram depicting party and systems involved in enrolment of a titleholder and the associated title into the system in embodiment of the present invention.

As shown in FIG. 3, the title authorization system 14 includes the following computer software procedures or system interfaces for implementing the title authorization service:

Enrol property interface 26: a system interface used by the FI 12 to enrol and lock a property into the title authorization service. This interface is accessed after the successful adjudication process of the purported titleholder 11 by the FI 12. Titles are deemed locked once the titleholder who is subscribing to the service enrols their property into the title authorization.

List enrolled properties interface 27: the system interface used by the FI 12 to request a list of enrolled properties for a specific titleholder. A list of enrolled properties is initiated at the request of a preferably strongly authenticated titleholder.

Title unlocking interface 28: the system interface used by the FI 12 to unlock a specific title for a specific titleholder for a specific trusted authority 17. A title unlocking request is initiated by a preferably strongly authenticated titleholder and triggers a notification to the selected trusted authority 17 and the titleholder.

Titleholder authentication manager 29: an internal interface used by the title authorization system 14 to manage (confirm, verify, audit, etc) the successful authentication of a purported titleholder 11. Preferably, the FI 12 forwards proof of a successful titleholder strong authentication to the title authorization system 14.

Trusted Authority Authentication Manager 30: an internal interface used by the title authorization system 14 to manage (e.g. confirm, verify, audit, etc) the successful authentication of a specific trusted authority 17. In the preferred embodiment, the LTS 18 forwards a proof of the successful trusted authority strong authentication to the title authorization system 14.

Notification system 31: an internal system used to manage notification via various external gateways such as email gateway, IVR, etc. Title authorization provides notification services for specific events including, for example: (1) to the FI 12 on any activities relating to a specific title authorization record; (2) the subscriber on any activities relating to a specific title authorization record; (3) to the trusted authority getting authorization from a subscriber to modify their title; (4) to the trusted authority on revocation or expiry of the authorization to modify a title.

Title authorization service title status check interface 32: a system interface used by the LTS 18 to query the status of a specific title. More specifically, this interface allow the LTS 18 to query the title authorization system 14 to verify if a change authorization is required for a specific title and to request title modification authorization for a specific title, and for a specific trusted authority prior to a title modification. This authorization may or may not be provided. In the case where the title has not been enrolled within the title authorization service, the title authorization system 14 responds with "Title is not enrolled in the title authorization service".

Title authorization title status update interface 33: a system interface used by the LTS 18 to notify the title authorization system 14 when a title update has been completed. The update information identifies if the specified title was sold or otherwise modifies. A status update request will trigger one of two possible actions: (1) remove the title from title authorization system 14 when the title is sold; or (2) re-lock the title otherwise and send a notification to the titleholder 11.

Search for Approved Trusted Authority interface 34: a system interface used by the title authorization system to request a list of trusted authorities approved to make modifications to the LTS 18. Preferably, the directory of approved trusted authorities is maintained by the LTS 18 and made available to the title authorization system 14. Alternately, the title authorization system 14 can connect to other third party directory to search for approved trusted authorities. In yet another variation, the title authorization system 14 can maintain its own directory of approved trusted authorities.

Title Enrolment

Figure 4:
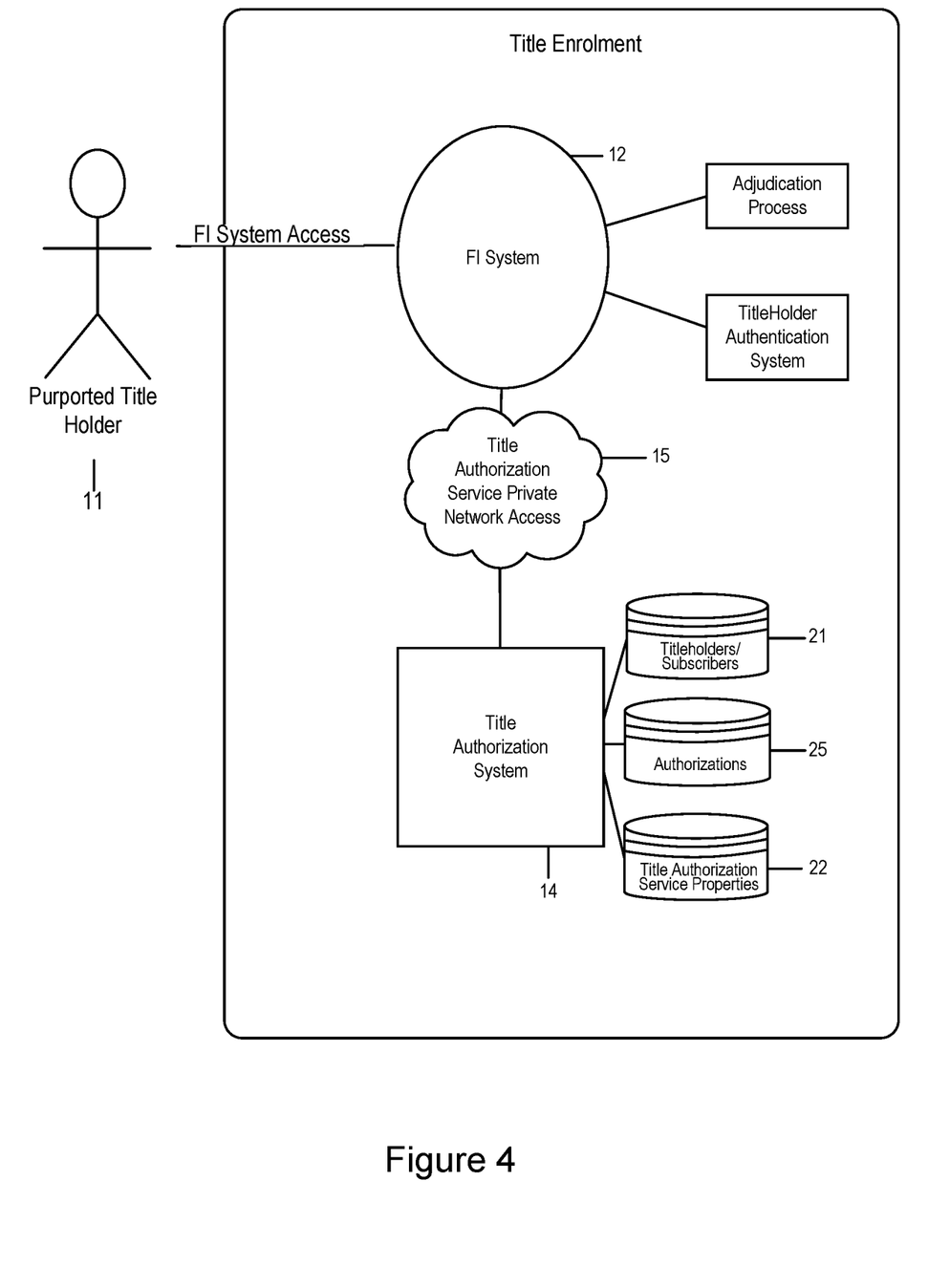
FIG. 4 is a flowchart depicting the steps in the method of enrolling a titleholder and the associated title into the system in an embodiment of the present invention.

As shown in FIG. 4, the FI 12 includes the following computer software procedures for enrolling a title to a real estate property into the title authorization system 14:

Titleholder Authentication System: a system that authenticates the identity of a purported titleholder 11 who is attempting to enrol a title to a real estate property into the title authorization system 14. As discussed above, the titleholder authentication system uses either personal information or biometric information, or both personal information and biometric information to authenticate the identity of the purported titleholder 11. In addition, a password that is only known to that person can be used in combination with the one or more of the aforementioned authentication factors to provide an additional level of security.

Adjudication Process: a procedure that determines whether the purported titleholder 11 who is attempting to enrol the real estate property, and whose identity has been authenticated by the titleholder authentication system, is the actual titleholder of that property. In general, one only the actual titleholder can provide a trusted authority with access to a title to a real estate property within the LTS 18.

Figure 5:
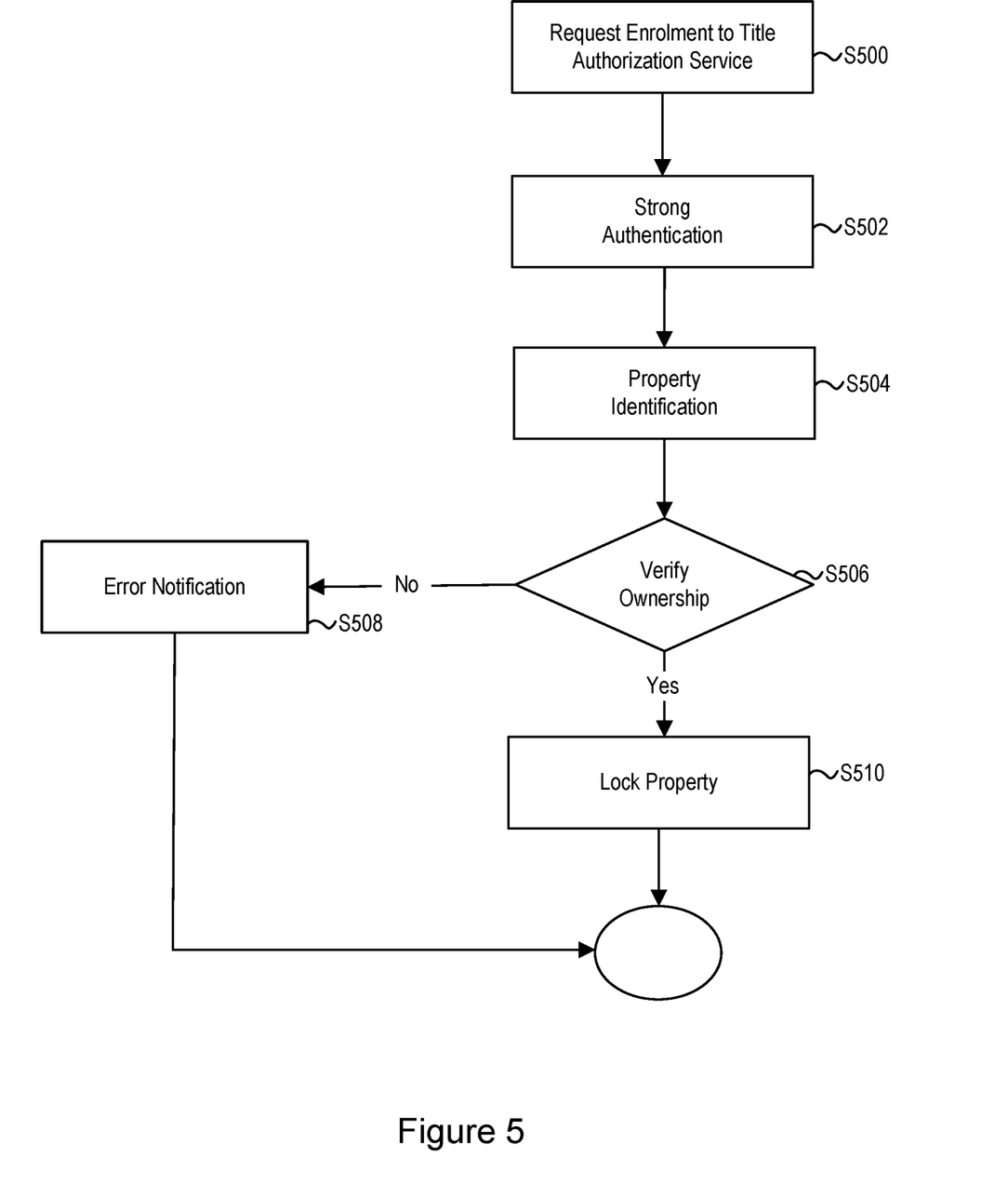
FIG. 5 is a flowchart depicting the steps in the method and system for a titleholder to access a record of his property within a database, and provide authorization to a selected, authorized trusted authority to access the selected record.

FIG. 5 depicts, by way of overview, the procedure by which a purported titleholder 11 enrols a title to real estate property in the title authorization service. The purported titleholder 11 first visits the website or branch of the FI and identifies him/herself to the FI. The purported titleholder 11 then requests enrolment of the property in the title authorization service, at step S500.

At step S502, the FI system 12 invokes the titleholder authentication system to authenticate the identity of the purported titleholder 11. If the identity of the purported titleholder 11 is successfully authenticated, the purported titleholder 11 specifies the particular property to be protected by the title authorization service, at step S504.

At step S506, the FI system 12 invokes the adjudication process which commands the title authorization system 14 to determine whether the purported titleholder 11 is a registered subscriber of the title authorization service, and whether the subscriber is the actual titleholder to the specified property. If the specified property is not owned by the subscriber, or if the purported titleholder 11 is not a registered subscriber of the title authorization service, the title authorization system 14 notifies the FI system 12, at step S508, and the enrolment process is aborted.

However, if the title authorization system 14 determines from the titleholder/subscriber database 21 that the purported titleholder 11 is a registered subscriber of the title authorization service, and also determines from the title authorization service properties database 22 that the subscriber is the actual titleholder to the specified property, at step S510 the property is enrolled in the title authorization service and locked on behalf of the titleholder/subscriber. If the specified property has more than one titleholder, preferably the property is not locked until the FI system 12 receives authorization from the remaining titleholders.

Title Locking

Figure 6:
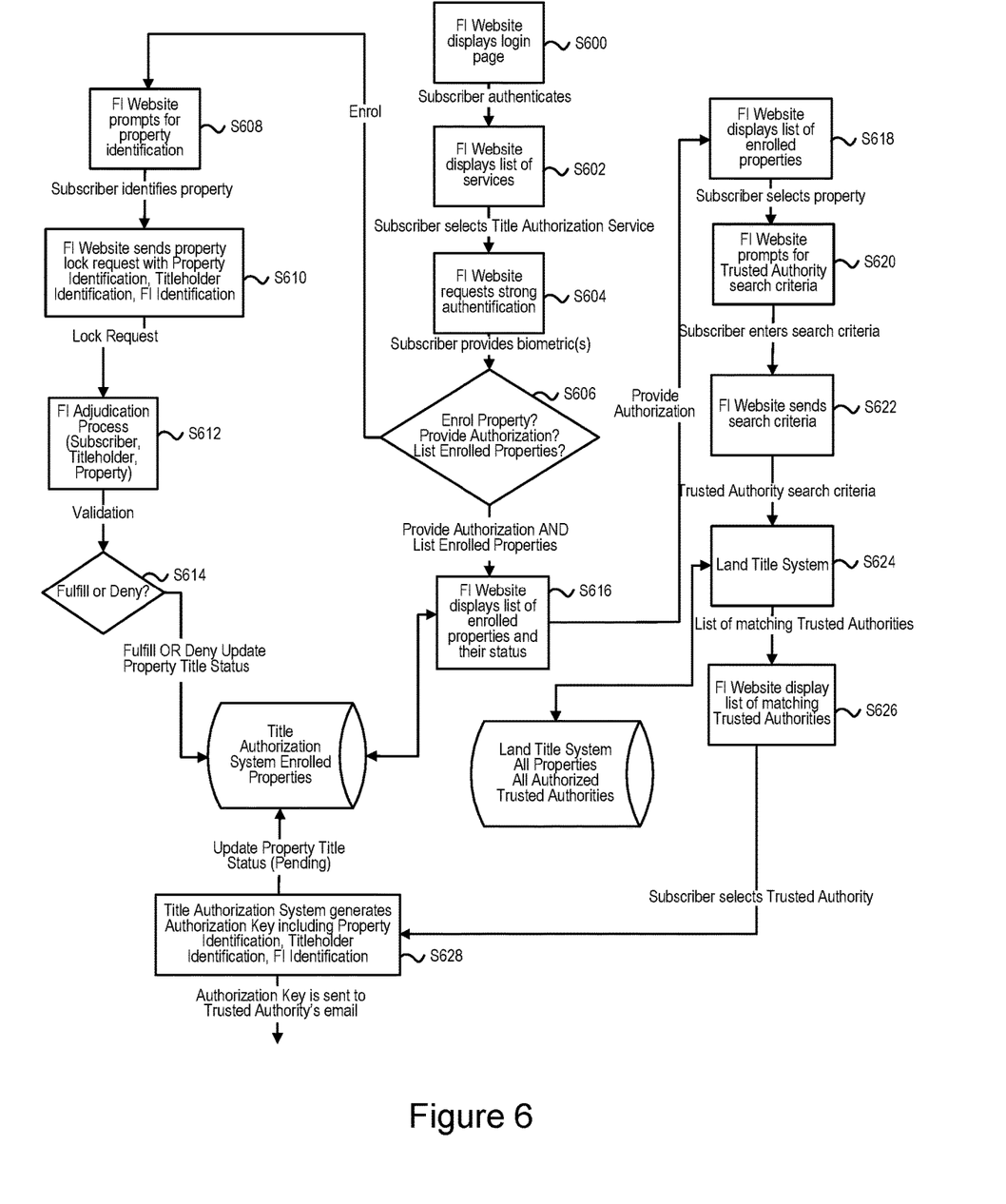
FIG. 6 is a diagram identifying the party and systems involved in modification of a title to a real estate property.

FIG. 6 depicts, in detail, the procedure by which a purported titleholder 11 enrols and locks title to a real estate property in the title authorization service. As above, the purported titleholder 11 uses a computer terminal to visit the website of the FI. The purported titleholder 11 then attempts to login to the FI website using a predetermined username/password, at step S600. If the login was successful, at step S602 the FI website displays a list of available services on the computer terminal of the purported titleholder 11. Possible services available from the FI include "Title Authorization Service", and conventional financial transaction services.

If the purported titleholder 11 selects "Title Authorization Service" from the list of available services, at step S604 the titleholder authentication system of the FI system 12 initiates strong authentication of the identity of the purported titleholder 11. If the identity of the purported titleholder 11 was strongly authenticated, the adjudication process of the FI system 12 commands the title authorization system 14 to determine whether the purported titleholder 11 is a registered subscriber of the title authorization service. If the title authorization system 14 determines from the titleholder/subscriber database 21 that the purported titleholder 11 is a registered subscriber of the title authorization service, at step S606 the FI website displays a list of service options on the computer terminal of the subscriber. Possible service options include "Enrol Property", "Provide Authorization" and "List Enrolled Properties".

If the subscriber selects "Enrol Property" from the list of service options at step S606, the FI website prompts the subscriber to identify the particular property to be protected by the title authorization network, at step S608. In response, the subscriber specifies the property for enrolment into the title authorization system 14. Then at step S610, the FI system 12 issues a "Lock Request" command that includes subscriber identity information, and the identity of the real estate property specified by the subscriber.

The FI adjudication process receives the "Lock Request" command at step S612, and commands the title authorization system 14 o determine whether the subscriber is the actual titleholder to the specified property, at step S614, and whether the specified property is not currently enrolled in the title authorization service. To do so, the title authorization system 14 first determines whether the specified property is listed in the authorization service properties database 22. If the title authorization system 14 determines that the specified property is not listed in the authorization service properties database 22, the title authorization system 14 commands the LTS 18 to determine whether the subscriber is the actual titleholder to the specified property. If the LTS 18 determines that the specified property is not owned by the subscriber, the process is aborted. However, if the subscriber is the actual titleholder to the specified property, the title authorization system 14 inserts a record in the title authorization service properties database 22 for the specified property, and updates the status field of the record to indicate that the title to the property is locked. Processing then proceeds to steps S616 and S618.

If the subscriber selects "List Enrolled Properties" from the list of service options at step S606, the FI website queries the title authorization system 14 for the real estate properties that the titleholder/subscriber has enrolled in the title authorization system 14. The FI website then displays the list of the real estate properties, together with the status (locked/unlocked) of each property, at step S616.

If the subscriber selects "Provide Authorization" from the list of service options at step S606, at step S618 the FI website prompts the subscriber to identify the particular property for which a title change is to be authorized. In response, the subscriber selects the desired property for the title change. Then at step S620, the FI website prompts the subscriber to input search criteria for the trusted authority who will be authorized to effect the title change to the specified property. Possible search criteria include name, city, province, or any other criteria that can be used to identify suitable trusted authorities.

Upon receipt, the FI system 12 forwards the trusted authority search criteria to the title authorization system 14 at step S622, which the title authorization system 14 forwards to the LTS 18. At step S624, the LTS 18 searches the trusted authority database 19 with the trusted authority search criteria, and provides the title authorization system 14 with a list of trusted authorities who satisfy the search criteria. The title authorization system 14 then forwards the list of trusted authorities to the FI system 12, which the FI website displays on the computer terminal of the subscriber, at step S626.

The subscriber selects one of the trusted authorities from the displayed list. Upon receipt, the FI system 12 forwards the trusted authority selection to the title authorization system 14. At step S628, the title authorization system 14 updates the trusted authority field of the record in the title authorization service properties database 22 for the specified property to identify the specified trusted authority.

The title authorization system 14 then generates an authorization key that includes the identity of the FI that issued the "Lock Request" command, identity information of the subscriber that requested enrolment of the real estate property, and the particulars of the real estate property. The authorization key indicates that the titleholder has identified the trusted authority as an individual who may be subsequently authorized to modify the title to the titleholder's property.

The title authorization system 14 then electronically transmits the authorization key to specified trusted authority by any suitable delivery means, including e-mail. The authorization key may be signed with the titleholder's digital signature (saved in the titleholder/subscribers database 21) to indicate that the titleholder has appointed the authorized authority, and may also be digitally signed by the title authorization system 14 to indicate that the authorization key was generated by the title authorization system 14.

Title Unlocking

Figure 7:
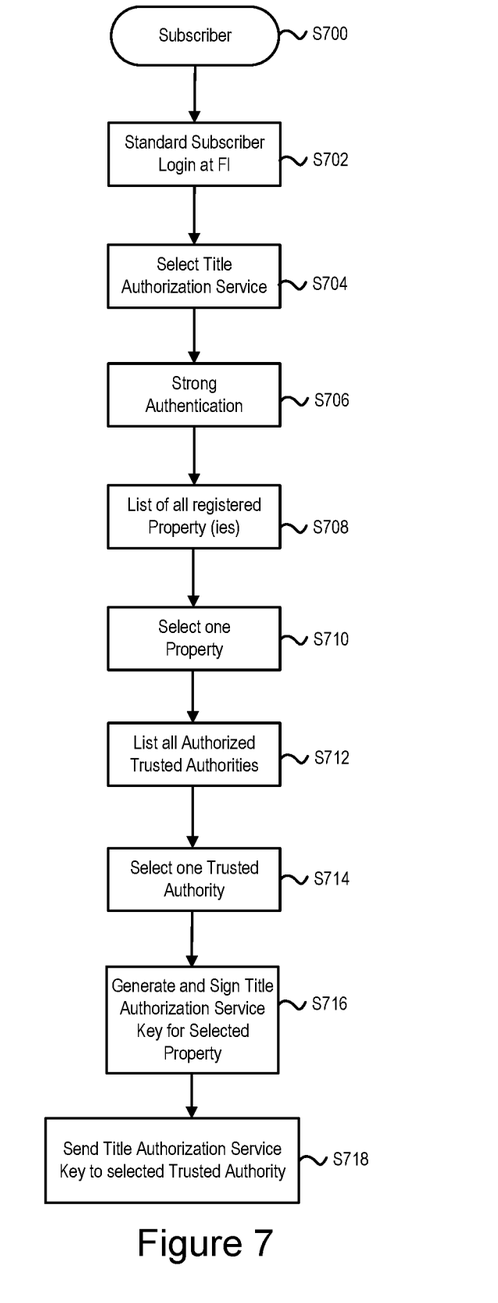
FIG. 7 is a flowchart depicting the steps for authorization of modification of a title within a record.

FIG. 7 is a flowchart that shows the procedure by which a titleholder authorizes a change in title to a real estate property. At step S700, the titleholder attempts to login to the FI website using a predetermined username/password. If the login was successful, at step S702 the FI website displays a list of available services on the computer terminal of the titleholder.

If the titleholder selects "Title Authorization Service" from the list of available services at step S704, the titleholder authentication system of the FI system 12 initiates strong authentication of the identity of the titleholder, at step S706. If the titleholder was strongly authenticated and is a registered subscriber of the title authorization service, the FI website displays a list of service options on the computer terminal of the titleholder.

If the titleholder selects "Send Authorization" from the list of service options, the FI system 12 queries the title authorization system 14 for the real estate properties that the subscriber has enrolled in the title authorization system 14. The FI website then displays the list of the real estate properties on the computer terminal of the titleholder, at step S708. In response, at step S710 the titleholder selects the property for which the titleholder is authorizing a title change.

The FI system 12 then queries the title authorization system 14 for a list of the trusted authorities who the titleholder has previously authorized to modify the title to the selected property. The FI website then displays the list of the trusted authorities on the computer terminal of the titleholder, at step S712. In response, the titleholder selects one of the trusted authority to record the title change, at step S714. The FI system 12 then commands the title authorization system 14 to select the record in the title authorization service properties database 22 that is associated with the selected property, and to update the status field of the selected record to indicate that title to the property is unlocked. The FI system 12 also commands the title authorization system 14 to select the authorization record in the authorization database 25 that is associated with the selected property, and to update the trusted authority field of the selected authorization record with the identifier that is associated with the selected trusted authority. The FI system 12 also commands the title authorization system 14 to update the expiry date field of the selected authorization record with an expiry date specified by the titleholder.

The title authorization system 14 then generates an authorization service key, at step S716, that indicates that the titleholder has appointed the selected trusted authority as the person authorized to modify the title to the titleholder's property. The authorization service key identifies the titleholder's property, and the expiry date by which the trusted authority must exercise the authorization (i.e. modify title to the titleholder's property).

The authorization service key may be digitally signed with the titleholder's digital signature to indicate that the titleholder has authorized the authorized authority to modify title to the titleholder's property, and may also be signed by the title authorization system 14 to indicate that the authorization service key was generated by the title authorization system 14. At step S718, the title authorization system 14 electronically transmits the authorization key to specified trusted authority by any suitable delivery means, including secure e-mail.

Title Modification

Figure 8:
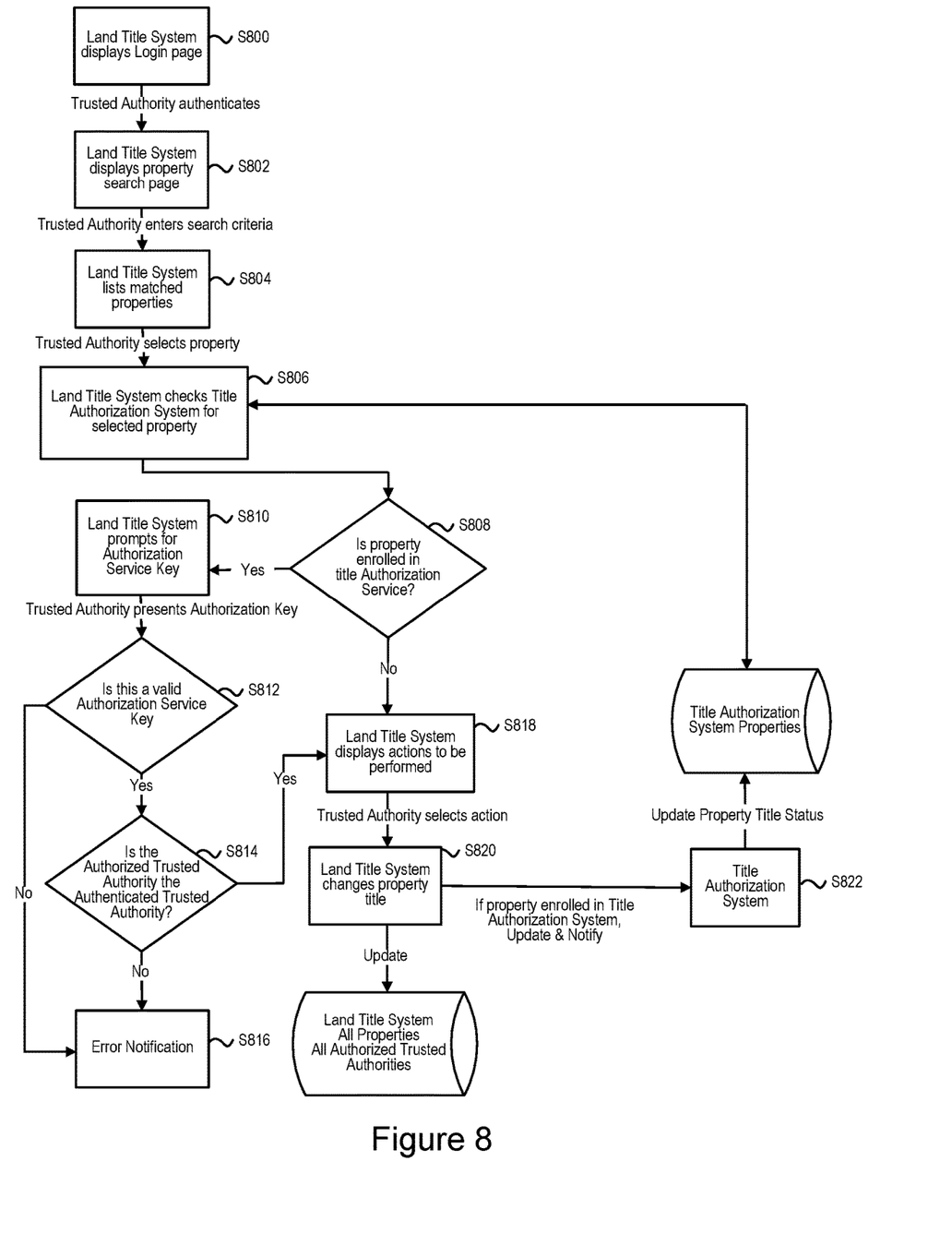
FIG. 8 is a flowchart depicting the steps for an authorized, selected trusted authority to access a record within the database and modifying the title in the record.

FIG. 8 is a flowchart that shows the procedure by which a trusted authority effects a change in title to a real estate property. At step S800, the trusted authority attempts to login to the LTS 18 using a predetermined username/password. If the login was successful, at step S802 the LTS 18 displays a property search page on the computer terminal of the trusted authority. The trusted authority enters property search criteria into the property search page. The LTS 18 searches the all properties database 23 with the property search criteria, and provides the trusted authority with a list of properties that satisfy the search criteria, at step S804. The trusted authority then selects one of the properties from the displayed list.

At step S806, the LTS 18 queries the title authorization system 14 with the selected property. In response, at step S808 the title authorization system 14 notifies the LTS 18 whether the selected property has been enrolled in the title authorization service. If the selected property has not been enrolled in the title authorization service, the LTS 18 allows the trusted authority to effect the change in title to the real estate property in the conventional manner.

However, if the title authorization system 14 confirms that the selected property has been enrolled in the title authorization service, at step S810 the LTS 18 prompts the trusted authority to provide the authorization service key that was previously forwarded to the trusted authority at step S716. Upon receipt, the LTS 18 forwards the authorization service key to the title authorization system 14.

At step S812, the title authorization system 14 determines the validity of the authorization service key by comparing the authorization service key, received at step S810, against the authorization service key generated at S714. If the authorization service key is invalid, the title authorization system 14 notifies the LTS 18 of an error, at step S816.

If the authorization service key is valid, at step S814 the LTS 18 forwards to the title authorization system 14 identification information of the trusted authority, and commands the title authorization system 14 to determine from the authorizations database 25 whether the trusted authority is one of the trusted authorities who the titleholder has authorized to effect a change in title to the titleholder's real estate property. If the identification information of the trusted authority matches one of the trusted authority identifiers in the trusted authority field of the record in the authorization database 25 that is associated with the specified real estate property, or if the expiry date field in the authorization database record indicates that the authorization provided by the titleholder has expired, the title authorization system 14 notifies the LTS 18 of an error, at step S816.

Otherwise, the title authorization system 14 selects the record in the title authorization service properties database 22 that is associated with the selected property. If the status field of the selected record indicates that title to the selected property is unlocked, at step S818 the title authorization system 14 allows the trusted authority to modify title to the titleholder's real estate property using the LTS 18. The LTS 18 then updates the all properties database 23 with the title change, at step S820. Otherwise, the title authorization system 14 notifies that the LTS 18 should prohibit the trusted authority from modifying title to the titleholder's real estate property.

If the title change is authorized, after the trusted authority has completed the change in title the LTS 18 commands the title authorization system 14 to remove from the authorizations database 25 the record that is associated with the selected real estate property, at step S822.

If the title change comprises a sale of the real estate property, the LTS 18 also commands the title authorization system 14 to remove the real estate property from the title authorization service. To do so, the title authorization system 14 removes from the title authorization service properties database 22 the record that is associated with the selected real estate property. Otherwise, if the title change does not comprise a sale of the real estate property (e.g. an encumbrance), the title authorization system 14 updates the status field of the record in the title authorization service properties database 22 to indicate that title to the selected property is locked again.

The title authorization system 14 then sends a confirmation message to the trusted authority and the titleholder confirming the change in title to the real estate property.

Numerous modifications, variations, and adaptations may be made to the embodiment described above without departing from the scope of the invention, which is defined in the following claims.

The invention claimed is:

1. A method for enhancing the security of an electronic land title registry system, the system comprising a registry server hosting a registry database accessible by a registry user, and an authorization server hosting an authorization database, the method comprising:

the registry server authenticating the registry user to access a title record in the registry database;

the registry server receiving a title record modification request associated with the registry user, the title record modification request corresponding to the title record in the registry database;

the registry server transmitting a title record query to the authorization server for the title record;

the authorization server querying the authorization database based on the title record query to determine whether an authorization record, corresponding to the title record, has been created in the authorization database by a record owner user;

when the authorization record does not exist, the authorization server notifying the registry server that the title record can be modified and, otherwise:

the authorization server requesting an authorization service key, and the registry server transmitting the authorization service key to the authorization server;

the authorization server verifying the authorization service key against a previously generated authorization service key stored at the authorization server;

the authorization server notifying the registry server when the authorization service key is verified to be valid;

the authorization server receiving from the registry server an indication of the registry user;

the authorization server verifying that the authorization service key corresponds to the registry user;

the authorization server determining, from the authorization record in the authorization database, that the registry user is authorized to modify the title record; and in response to determining that the registry user is authorized to modify the title record, the authorization server notifying the registry server that the title record can be modified and, otherwise, notifying the registry server that the title record is not to be modified; and in response to notification from the authorization server that the record can be modified, the registry server modifying the record in the registry database in accordance with the record modification request.

2. The method of claim 1, further comprising, prior to receiving the title record modification request, performing biometric authentication of the registry user.

3. The method of claim 1, wherein notifying the registry server that the title record can be modified comprises notifying the registry server of a predetermined time period in which the title record can be modified.

4. The method of claim 1, wherein determining whether the record requires additional authorization to be modified comprises determining whether the record owner user has set a locked status field in the authorization database corresponding to the record in the electronic database.

5. An electronic database system, the system comprising:
an authorization server comprising an authorization server memory and an authorization server process; and
a registry server comprising a registry server memory and a registry server processor, the registry server processor configured to:
host a registry database accessible by a registry user;
authenticate the registry user to access a title record in the registry database;
receive a title record modification request associated with the registry user, the title record modification request corresponding to a title record in the registry database;
transmit a title record query to the authorization server for the title record;
transmit an authorization service key to the authorization server upon request by the authorization server;
when notified by the authorization server that the authorization service key is verified to be valid, transmit an indication of one or more registry users authorized to modify the title record;
receiving a notification from the authorization server that the title record can be modified; and
in response to the notification from the authorization server that the record can be modified, the registry server modifying the record in the registry database in accordance with the record modification request; and
wherein the authorization server is configured to:
host an authorization database accessible by a record owner user;
query the authorization database based on the title record query to determine whether an authorization record, corresponding to the title record, has been created in the authorization database by a record owner user;
when the authorization record does not exist, notify the registry server that the title record can be modified and, otherwise:
request and receive the authorization service key;
verify the authorization service key against a previously generated authorization service key stored at the authorization server;
notify the registry server when the authorization service key is verified to be valid;
receive from the registry server the indication of the registry user;
verify that the authorization service key corresponds to the registry user;

determine, from authorization record in the authorization database, that the registry user is authorized to modify the title record; and
in response to determining that the registry user is authorized to modify the title record, notify the registry server that the title record can be modified and, otherwise, notify the registry server that the title record is not to be modified.

6. The system of claim 5, wherein the registry server processor is further configured to perform biometric authentication of the registry user prior to receiving the title record modification request.

7. The system of claim 5, wherein notifying the registry server that the title record can be modified comprises notifying the registry server of a predetermined time period in which the title record can be modified.

8. The system of claim 5, wherein determining whether the record requires additional authorization to be modified comprises determining whether the record owner user has set a locked status field in the authorization database corresponding to the record in the electronic database.

9. A method for enhancing the security of an electronic database system, the system comprising a registry server hosting a registry database accessible by a registry user, and an authorization server hosting an authorization database accessible by a record owner user, the method comprising:
receiving a title record query from a registry server for a title record in the registry database, the title record query associated with the registry user authenticated by the registry server;
querying the authorization database based on the title record query to determine whether an authorization record, corresponding to the title record, has been created in the authorization database by a record owner user;
when the authorization record does not exist, notifying the registry server that the title record can be modified and, otherwise:
requesting an authorization service key from the registry server, and receiving the authorization service key from the registry server;
verifying the authorization service key against a previously generated authorization service key stored at the authorization server;
notifying the registry server when the authorization service key is verified to be valid;
receiving from the registry server an indication of the registry user;
verifying that the authorization service key corresponds to the registry user;
determining, from the authorization record in the authorization database, that the registry user is authorized to modify the title record;
in response to determining that the registry user is authorized to modify the title record, notifying the registry server that the title record can be modified and, otherwise, notifying the registry server that the title record is not to be modified; and
in response to notification from the authorization server that the record can be modified, the registry server modifying the record in the registry database in accordance with the record modification request.

10. The method of claim 9, wherein notifying the registry server that the title record can be modified comprises notifying the registry server of a predetermined time period in which the title record can be modified.

11. The method of claim 9, wherein determining whether the record requires additional authorization to be modified comprises determining whether the record owner user has set a locked status field in the authorization database corresponding to the record in the electronic database.

12. A non-transitory computer-readable medium storing computer-executable instructions, which when executed by a computer processor, cause the computer processor to perform a method for enhancing the security of an electronic land title registry system, the system comprising a registry server hosting a registry database accessible by a registry user, and an authorization server hosting an authorization database, the method comprising:
   receiving a title record query from a registry server for a title record in the registry database, the title record query associated with the registry user authenticated by the registry server;
   querying the authorization database based on the title record query to determine whether an authorization record, corresponding to the title record, has been created in the authorization database by a record owner user;
   when the authorization record does not exist, the authorization server notifying the registry server that the title record can be modified and, otherwise:
   the authorization server requesting an authorization service key from the registry server, and receiving the authorization service key from the registry server;
   verifying the authorization service key against a previously generated authorization service key stored at the authorization server;
   notifying the registry server when the authorization service key is verified to be valid;
   receiving from the registry server an indication of the registry user;
   verifying that the authorization service key corresponds to the registry user;
   determining, from the authorization record in the authorization database, that the registry user is authorized to modify the title record;
   in response to determining that the registry user is authorized to modify the title record, notifying the registry server that the title record can be modified and, otherwise, notifying the registry server that the title record is not to be modified; and
   in response to notification from the authorization server that the record can be modified, the registry server modifying the record in the registry database in accordance with the record modification request.

13. The computer-readable medium of claim 12, wherein notifying the registry server that the title record can be modified comprises notifying the registry server of a predetermined time period in which the title record can be modified.

14. The computer-readable medium of claim 12, wherein determining whether the record requires additional authorization to be modified comprises determining whether the record owner user has set a locked status field in the authorization database corresponding to the record in the electronic database.

15. A method for enhancing the security of an electronic database system, the system comprising a registry server hosting a registry database accessible by a registry user, and an authorization server hosting an authorization database, the method comprising:
   authenticating the registry user to access a title record in the registry database;
   receiving a title record modification request associated with the registry user, the title record modification request corresponding to a title record in the registry database;
   transmitting a title record query to the authorization server for the title record;
   receiving a request from the authorization server for an authorization service key when a result of the title record query indicates that a corresponding authorization record exists in an authorization database of the authorization server;
   transmitting the authorization service key to the authorization server;
   receiving a notification from the authorization server when the authorization service key is verified to be valid;
   transmitting an indication of one or more registry users authorized to modify the title record to the authorization server;
   when the authorization service key is verified and the title record is able to be modified, or when the authorization record does not exist, receiving a notification from the authorization server that the title record can be modified, and otherwise, receiving a notification from the authorization server that the title record is not to be modified; and
   in response to notification from the authorization server that the record can be modified, the registry server modifying the record in the registry database in accordance with the record modification request.

16. The method of claim 15, further comprising, prior to receiving the title record modification request, performing biometric authentication of the registry user.

17. The method of claim 15, wherein the notification that the title record can be modified comprises a predetermined time period in which the title record can be modified.

18. The method of claim 15, wherein determining whether the record requires additional authorization to be modified comprises determining whether the record owner user has set a locked status field in the authorization database corresponding to the record in the electronic database.

* * * * *